United States Patent
Endo et al.

(10) Patent No.: US 6,905,647 B2
(45) Date of Patent: *Jun. 14, 2005

(54) PROCESS FOR PRODUCING GOLF BALL

(75) Inventors: Seiichiro Endo, Kobe (JP); Keiji Ohama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 160 days.

This patent is subject to a terminal disclaimer.

(21) Appl. No.: 10/254,838

(22) Filed: Sep. 26, 2002

(65) Prior Publication Data

US 2003/0080469 A1 May 1, 2003

(30) Foreign Application Priority Data

Oct. 3, 2001 (JP) .......................................... 2001-307829

(51) Int. Cl.⁷ .......................... B29C 65/18; B29C 65/02; B29C 70/46; B29C 70/58; A63B 45/00
(52) U.S. Cl. ........................ 264/248; 264/148; 264/161; 264/250; 264/271.1; 264/279; 264/279.1; 264/320; 425/420; 425/812; 473/371; 473/373; 473/374; 473/375; 473/376; 473/377
(58) Field of Search ................................ 264/148, 161, 264/248, 250, 271.1, 279, 279.1, 320; 473/371, 373–377; 425/320, 420, 812

(56) References Cited

U.S. PATENT DOCUMENTS

| | | | | |
|---|---|---|---|---|
| 3,130,102 A | * | 4/1964 | Watson et al. ............... | 156/228 |
| 3,344,468 A | * | 10/1967 | Moslo ......................... | 425/116 |
| 4,501,715 A | * | 2/1985 | Barfield et al. .............. | 264/248 |
| 5,050,886 A | * | 9/1991 | Yamagishi et al. ......... | 473/372 |
| 5,574,107 A | | 11/1996 | Hiraoka et al. ............. | 473/373 |
| 5,779,562 A | | 7/1998 | Melvin et al. ............... | 525/193 |
| 5,823,889 A | * | 10/1998 | Aoyama ..................... | 473/374 |
| 5,967,907 A | * | 10/1999 | Takemura et al. .......... | 473/373 |
| 6,039,910 A | * | 3/2000 | Tanaka et al. .............. | 264/248 |
| 6,135,899 A | * | 10/2000 | Maruko ...................... | 473/376 |
| 6,186,906 B1 | * | 2/2001 | Sullivan et al. ............. | 473/351 |
| 6,270,429 B1 | * | 8/2001 | Sullivan ..................... | 473/374 |
| 6,361,453 B1 | | 3/2002 | Nakamura et al. .......... | 473/371 |
| 6,555,627 B2 | * | 4/2003 | Bissonnette et al. ........ | 525/274 |
| 2002/0016223 A1 | * | 2/2002 | Sullivan ..................... | 473/374 |
| 2003/0153406 A1 | * | 8/2003 | Endo et al. ................. | 473/371 |

* cited by examiner

Primary Examiner—Michael P. Colaianni
Assistant Examiner—Michael I. Poe
(74) Attorney, Agent, or Firm—Birch, Stewart, Kolasch & Birch, LLP

(57) ABSTRACT

Golf ball 1 includes a core 2 and a cover 3. The core 2 has two layers including a center 4 and a mid layer 5. The mid layer 5 is formed by covering the center 4 with two half shells comprising a rubber composition, and by compression and heating of the center 4 and half shells in a mold. The rubber composition contains solid particles dispersed therein. The solid particles have a ratio "D/T", i.e., a ratio of the particle size D to the thickness of the mid layer T, of equal to or greater than 0.3. Upon molding, the solid particles inhibit the center 4 to approach a cavity face. Accordingly, deviation of mass of the mid layer 5 can be suppressed. The solid particles have a ratio "W/T", i.e., a ratio of the radial width W thereof to the thickness of the mid layer T, of from 0.3 to 1.0.

4 Claims, 5 Drawing Sheets

PROCESS FOR PRODUCING GOLF BALL

BACKGROUND OF THE INVENTION

1. Field of the Invention

The present invention relates to golf balls. More particularly, the present invention relates to golf balls having a mid layer comprising a crosslinked rubber.

2. Description of the Related Art

Golf balls used for playing golf at a golf course are generally classified into: wound golf balls having a core comprising wound rubber threads; and solid golf balls (two-piece golf balls, three-piece golf balls and the like) having a core comprising a solid rubber. Wound golf balls have been conventionally used, with a period during which the wound golf balls account for almost all of the first-class golf balls. However, solid golf balls that have been developed afterwards can be readily manufactured at a lower cost, therefore, larger number of solid golf balls have been recently supplied to the market than the wound golf balls. In general, solid golf balls have drawbacks in a feel at impact being hard. To the contrary, common solid golf balls are more excellent in terms of a travel distance than wound golf balls.

In an attempt to improve a feel at impact or to further enhance a flight performance, solid golf balls including a core having two layers, i.e., a center and a mid layer, have been proposed and placed on the market. Half shell methods are often adopted to produce such golf balls. In a half shell method, dome shaped half shells are first formed from a rubber composition for the mid layer. Next, a center is covered with two half shells. These center and half shells are placed into a spherical cavity of a mold, and then the mold is clamped. Upon clamping of the mold, excess rubber composition outflows from a parting face of the mold. A mid layer is thus formed. Processes for producing golf balls according to such a half shell method are disclosed in Japanese Patent Publication References JP-A-24124/1998, JP-A-99470/1998 and JP-A-108921/1998.

Meanwhile, a variety of techniques have been proposed where particles (solids) comprising a crosslinked rubber or a synthetic resin are blended in a core of a golf ball. For example, a core blended with particles of ebonite that is a highly hard rubber is disclosed in Japanese Patent Publication Reference JP-A-94666/1986. In Japanese Patent Publication Reference JP-A-91019/1994, there is disclosed a core blended with high-molecular weight polyethylene (trade name: "Miperon XM220") having a shore D hardness of about 65. In Japanese Patent Publication Reference JP-A-185039/1995, there is disclosed a golf ball with mitigated impulsive force at impact through blending vulcanized rubber powder having a particle diameter of from 0.8 mm to 7.0 mm in a core. In Japanese Patent Publication Reference JP-A-314342/1998 (U.S. Pat. No. 5,779,562), there is disclosed a golf ball having a central core layer, an outer core layer, an inner cover layer (This inner cover layer can be also assumed as an outermost layer of the core.) and an outer cover layer, wherein polypropylene powder is blended in the core.

In Japanese Patent Publication Reference JP-A-583/2001 (U.S. Pat. No. 6,361,453), there is disclosed a golf ball having a core blended with particles of which hardness being higher than the hardness of the core surface. In Japanese Patent Publication Reference JP-A-584/2001 (U.S. Pat. No. 6,361,453), there is disclosed a golf ball having a core blended with particles whose difference from the core being small in their specific gravity. In Japanese Patent Publication Reference JP-A-587/2001 (U.S. Pat. No. 6,361,453), there is disclosed a golf ball having a core blended with particles, without exposure of these particles to the core surface. Japanese Patent Publication Reference JP-A-29511/2001 discloses a golf ball having a mid layer including rubber particles dispersed in a thermoplastic resin.

When the mid layer is formed by the half shell method described above, the center is neither supported nor immobilized. Therefore, the center may be migrated within the cavity upon streaming and/or outflowing of the rubber composition for the mid layer, and thus positional shift may occur between the central part of the center and the central part of the cavity. When the positional shift occurs, deviation of mass of the mid layer (uneven wall thickness) arises, thereby resulting in varying extent of spin, launch angle, initial velocity, travel distance, trajectory and feel upon impact of the golf ball in dependence upon the hitting point. Deviation of mass also adversely affects on durability and straight flight performance of the golf ball.

SUMMARY OF THE INVENTION

A process for producing a golf ball according to the present invention comprises the following steps (A) and (B):

(A) a kneading step to obtain a rubber composition by kneading a base rubber, a crosslinking agent and solid particles; and (B) a molding step to form a mid layer by placing a center and said rubber composition disposed around the center into a spherical cavity of a mold comprising upper and lower portion, followed by compression of the rubber composition in the mold, and by allowing excess rubber composition to outflow from a space between the upper portion and the lower portion of the mold.

In each of the steps, adjustment is executed so that 6 or more solid particles having a ratio "D/T", i.e., a ratio of the particle size D (mm) to the thickness of the mid layer T (mm), of equal to or greater than 0.3, are included in the mid layer. Alternatively, in each of the steps, adjustment is executed so that 6 or more solid particles having a ratio "W/T", i.e., a ratio of the radial width W (mm) thereof to the thickness of the mid layer T (mm), of from 0.3 to 1.0, are included in the mid layer.

In this process for producing a golf ball, solid particles abut on the cavity surface and the center surface to behave like a bridge retainer thereby preventing migration of the center. Therefore, deviation of mass of the mid layer is suppressed in accordance with this process for the production.

A process for producing a golf ball according to another aspect of the present invention comprises the following steps (C) to (G):

(C) a kneading step to obtain a rubber composition by kneading a base rubber and a crosslinking agent;

(D) a preliminary molding step to form a half shell from said rubber composition;

(E) an embedding step to embed solid particles into said half shell;

(F) a covering step to cover a center with two half shells;

(G) a molding step to form a mid layer by placing thus integrated center and half shells into a spherical cavity of a mold comprising upper and lower portion followed by compression of the half shells in the mold, and by allowing excess rubber composition to outflow from a space between the upper portion and the lower portion of the mold.

In each of the steps, adjustment is executed so that 6 or more solid particles having a ratio "D/T", i.e., a ratio of the particle size D (mm) to the thickness of the mid layer T (mm), of equal to or greater than 0.3, are included in the mid layer. Alternatively, in each of the steps, adjustment is executed so that 6 or more solid particles having a ratio "W/T", i.e., a ratio of the radial width W (mm) thereof to the thickness of the mid layer T (mm), of from 0.3 to 1.0, are included in the mid layer.

Also in this process for producing a golf ball, solid particles abut on the cavity surface and the center surface to behave like a bridge retainer thereby preventing migration of the center. Therefore, deviation of mass of the mid layer is suppressed in accordance with this process for the production. In this process for the production, the solid particles can be arranged to predetermined positions in the half shell.

DESCRIPTION OF THE PREFERRED EMBODIMENTS

The present invention is hereinafter described in detail with appropriate references to the accompanying drawing according to the preferred embodiments of the present invention.

Figure 1:
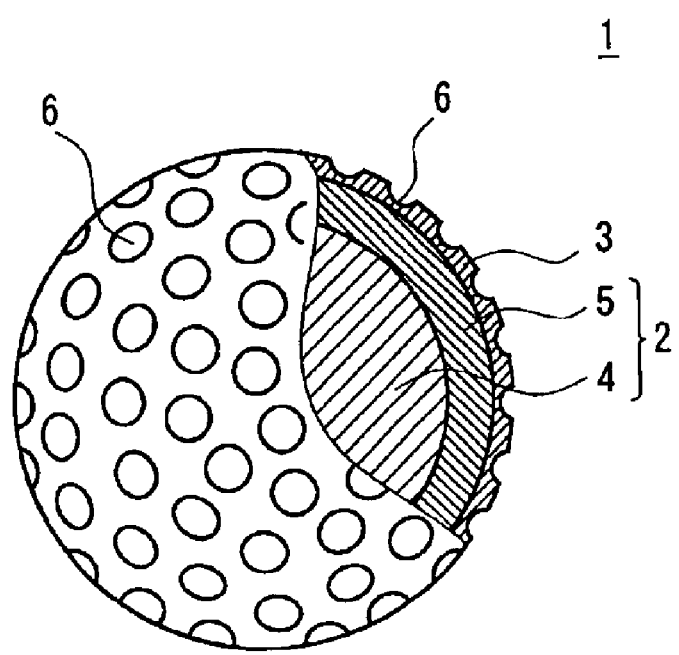
FIG. 1 is a schematic view illustrating a golf ball according to one embodiment of the present invention with a partially cut off cross-section.

A golf ball 1 depicted in FIG. 1 has a core 2 and a cover 3. The core 2 has two layers including a center 4 and a mid layer 5. Numerous dimples 6 are formed on the surface of the cover 3. This golf ball 1 has a paint layer and a mark layer on the outer surface of the cover 3, although not shown in the Figure. This golf ball 1 usually has a diameter of from 40 mm to 45 mm, and in particular, of from 42 mm to 44 mm. In light of the reduction of air resistance in the range to comply with a rule defined by United States Golf Association (USGA), the diameter is preferably from 42.67 mm to 42.80 mm. Further, this golf ball 1 has a weight of from 44 g to 46 g, and in particular, of from 45.00 g to 45.93 g.

Figure 2:
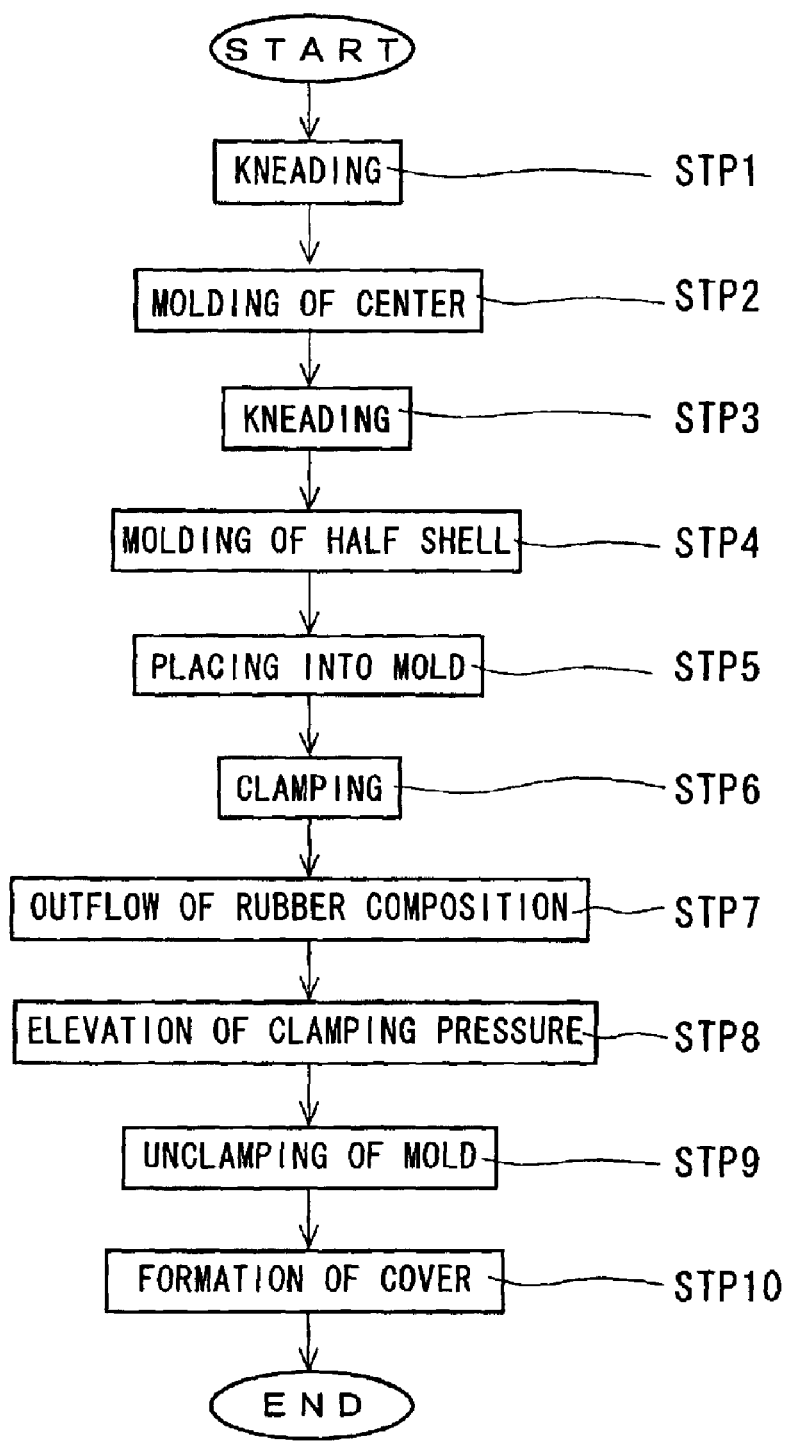
FIG. 2 is a flowchart illustrating one example of a process for producing the golf ball shown in FIG. 1.

FIG. 2 is a flowchart illustrating one example of the process for producing the golf ball 1 shown in FIG. 1. In this process for the production, a base rubber, a crosslinking agent, additives and the like are first kneaded (STP 1) to give a rubber composition. Next, this rubber composition is placed into a spherical cavity of a mold followed by compression and heating. Accordingly, a spherical center 4 is formed (STP2). In general, heating initiates a crosslinking reaction, thereby the rubber composition is cured.

Figure 3:
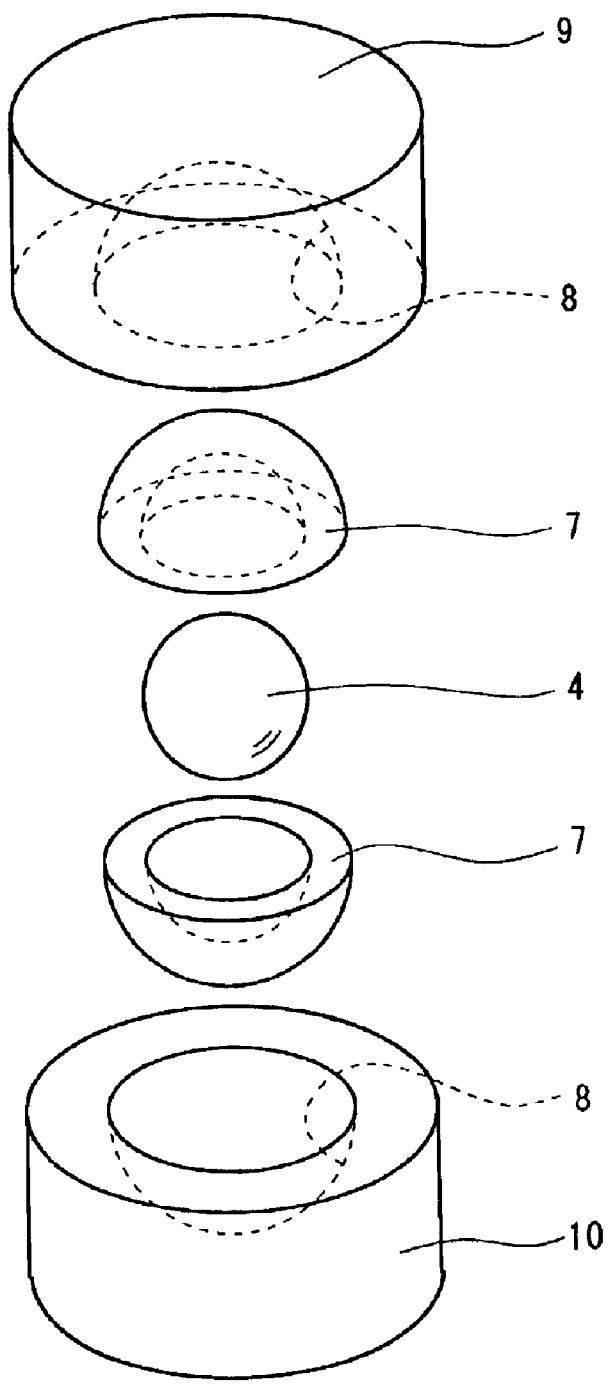
FIG. 3 is a disassembled perspective view illustrating the step of placing in the process for producing a golf ball shown in FIG. 2.

Next, a base rubber, a crosslinking agent, additives, solid particles and the like are kneaded (STP3) to give a rubber composition. Thereafter, half shells 7 shown in FIG. 3 are formed from this rubber composition (STP4). In order to form the half shells, a mold comprising a hemispherical cavity and a hemispherical protrusion is utilized. Solid particles are dispersed in the half shells 7.

Next, the center 4 is covered with two half shells, and the half shells 7 and the center 4 are placed into a mold (STP5). The mold comprises an upper portion 9 and a lower portion 10 each having a hemispherical cavity face 8 as shown in FIG. 3. Then, the mold is clamped (STP6). Upon clamping, a pressure for clamping the mold is regulated so that a minute space is provided between the upper portion 9 and the lower portion 10. The rubber composition (half shell 7) is compressed by the mold clamping. Generally, temperature of the mold is elevated concurrently with the compression to heat the rubber composition. In accordance with the compression and heating, the rubber composition in the cavity flows, and thus excess rubber composition outflows from a space between the upper portion 9 and the lower portion 10 (STP7).

At the stage when the outflow of the excess rubber composition is almost completed, the pressure for clamping the mold is increased (STP8). Accordingly, the upper portion 9 and the lower portion 10 are almost entirely contacted. Thereafter, the rubber composition hardly outflows. Through keeping this state, crosslinking reaction of the rubber proceeds thereby curing the rubber composition to form the mid layer 5. In this mid layer 5, solid particles are dispersed in a rubber matrix. The mold is unclamped (STP9), and the core 2 having the center 4 and the mid layer 5 is removed from the cavity. The cover 3 is formed around this core 2 by a known procedure (e.g., an injection molding method) (STP10), to obtain the golf ball 1.

Figure 4:
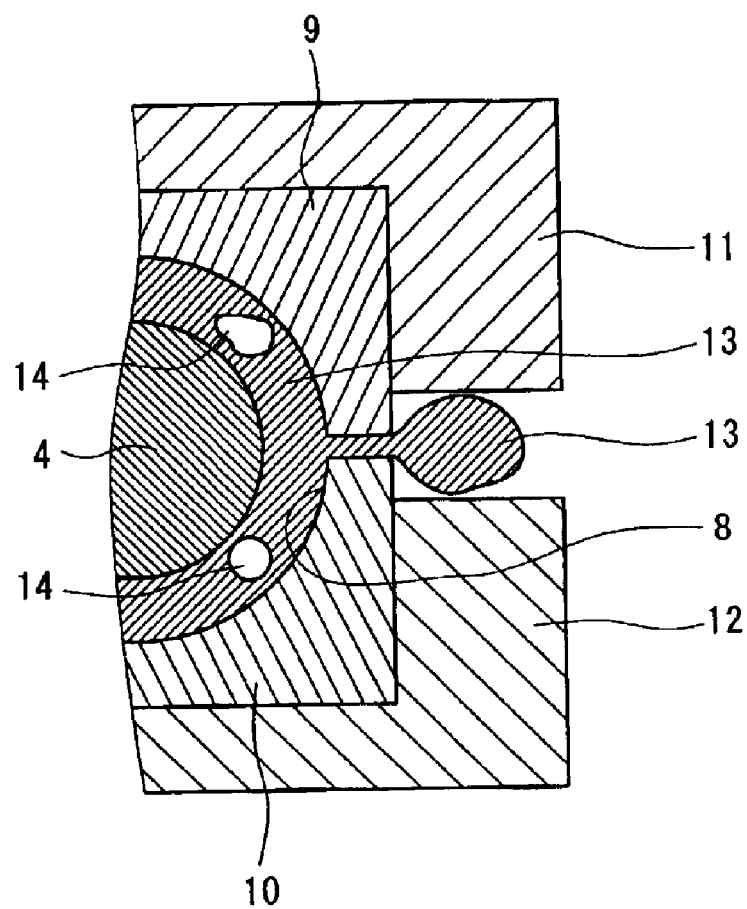
FIG. 4 is a cross sectional view illustrating a mode of the step in which the rubber composition outflows in the process for production shown in FIG. 3.

FIG. 4 is a cross sectional view illustrating a mode of the step 7 in which the rubber composition outflows in the process for production shown in FIG. 3. In this figure, numeral 11 represents an upper plate into which an upper portion 9 is incorporated, and numeral 12 represents a lower plate into which a lower portion 10 is incorporated. In this FIG. 4, a state is depicted in which the compressed rubber composition 13 (the rubber composition forming the half shell 7) is outflowing from a space between the upper portion 9 and the lower portion 10.

As described above, solid particles 14 are dispersed in the half shell 7. The solid particles 14 are interposed between the center 4 and the cavity face 8. Even though the center 4 is going to migrate in the direction to approach the cavity face 8 following the flow of the rubber composition 13, the solid particles 14 inhibit such migration. Deviation of mass of the mid layer 5 is thereby prevented. The golf ball 1 having a mid layer 5 without any deviation of mass exhibits almost equivalent extent of spin, launch angle, initial velocity, travel distance, trajectory and feel upon impact in every case where any position of the ball is hit by a golf club. This golf ball 1 is also excellent in durability and straight flight performance.

The half shell 7 may be subjected to a semivulcanizing state prior to a stage in which it covers over the center 4. The semivulcanizing state may be achieved concurrently with the formation of the half shell 7 (STP4), or may be achieved in another step after forming the half shell 7.

After the center 4 is covered with the half shell 7, these may be subjected to preliminary molding prior to being placed into a mold (STP5). In this instance, a formed body resulting from the preliminary molding is placed into a mold. The half shell 7 subjected to the preliminary molding may be in either of an unvulcanized state or a semivulcanized state.

A disc-shaped or plate-shaped rubber piece may be placed in stead of the half shells 7 into the mold together with the center 4. Also in this instance, the solid particles 14 dispersed in the rubber piece inhibit such migration of the center 4. Half shell without solid particles 14 dispersed therein may be formed beforehand, followed by embedding of the solid particles 14 into the half shell. According to this procedure, solid particles 14 can be arranged to the intended positions within the half shell.

Solid particle 14 referred to herein means a particle consisting of a substance which does not exhibit fluidity in the step of outflow of the rubber composition (STP7). Preferable materials for the solid particle 14 include crosslinked rubbers. In this instance, similar materials to those for the mid layer 5 rubber matrix described below in detail are suitably used. In particular, it is preferred that a base polymer for the solid particles 14 and a base polymer for the rubber matrix are identical in view of the uniformization of the properties of the core 2.

The solid particles 14 may contain a synthetic resin as a primary component. In view of the inhibition of migration of the center 4, a synthetic resin is suitable having a higher softening point than the temperature of the rubber composition in the step of outflow of the rubber composition (STP7). Particularly preferable synthetic resins which can be illustrated include ionomer resins and thermoplastic elastomer, and mixtures thereof.

Of the ionomer resins, copolymers of α-olefin and α,β-unsaturated carboxylic acid having 3 to 8 carbon atoms in which part of the carboxylic acid is neutralized with a metal ion are suitable. As the α-olefin herein, ethylene and propylene are preferred. Acrylic acid and methacrylic acid are preferred as the α,β-unsaturated carboxylic acid. Metal ions for the neutralization include: alkaline metal ions such as sodium ion, potassium ion, lithium ion and the like; bivalent metal ions such as zinc ion, calcium ion, magnesium ion and the like; trivalent metal ions such as aluminum ion, neodymium ion and the like. The neutralization may also be carried out with two or more kinds of metal ions. In light of the resilience performance and durability of the golf ball 1, particularly preferable metal ion is sodium ion, zinc ion, lithium ion and magnesium ion.

Specific examples of suitable ionomer resin include "Himilan 1555", "Himilan 1557", "Himilan 1601", "Himilan 1605", "Himilan 1652", "Himilan 1705", "Himilan 1706", "Himilan 1707", "Himilan 1855", "Himilan 1856", trade names by Mitsui-Dupont Polychemical Co. Ltd.; "Surlyn® 9945", "Surlyn® 8945", "Surlyn® AD8511", "Surlyn® AD8512", trade names by Dupont; and "IOTEK 7010", "IOTEK 8000", trade names by Exxon Corporation, and the like. Two or more ionomer resins may be used in combination.

Preferable thermoplastic elastomers include thermoplastic polyurethane elastomers, thermoplastic polyamide elastomers, thermoplastic polyester elastomers, thermoplastic styrene elastomers, thermoplastic elastomers having OH groups at their ends, and the like. Two or more thermoplastic elastomers may be used in combination. In light of the resilience performance of the golf ball 1, thermoplastic polyester elastomers and thermoplastic styrene elastomers are particularly suitable.

Thermoplastic styrene elastomers (thermoplastic elastomers containing styrene blocks) include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS and hydrogenated SIBS. Exemplary hydrogenated SBS include styrene-ethylene-butylene-styrene block copolymers (SEBS). Exemplary hydrogenated SIS include styrene-ethylene-propylene-styrene block copolymers (SEPS). Exemplary hydrogenated SIBS include styrene-ethylene-ethylene-propylene-styrene block copolymers (SEEPS).

Illustrative examples of thermoplastic polyurethane elastomers include "Elastolan", trade name by BASF Polyurethane Elastomers Co., Ltd., and more specifically, "Elastolan ET880" can be exemplified. Illustrative examples of thermoplastic polyamide elastomers include "Pebax®", trade name by Toray Industries, Inc., and more specifically, "Pebax® 2533" can be exemplified. Illustrative examples of thermoplastic polyester elastomers include "Hytrel®", trade name by Dupont-Toray Co., Ltd., and more specifically, "Hytrel® 3548" and "Hytrel® 4047" can be exemplified. Illustrative examples of thermoplastic styrene elastomers include "Rabalon®", trade name by Mitsubishi Chemical Corporation, and more specifically, "Rabalon®SR04" can be exemplified.

To the solid particles 14, diene block copolymers may be blended. A diene block copolymer has double bonds derived from a conjugated diene compound of a block copolymer or a partially hydrogenated block copolymer. The block copolymer comprises a polymer block of which basis being at least one vinyl aromatic compound, and a polymer block of which basis being at least one conjugated diene compound. A partially hydrogenated block copolymer can be obtained by hydrogenation of the block copolymer as described above.

Exemplary vinyl aromatic compounds that constitute the block copolymer include styrene, α-methylstyrene, vinyltoluene, p-t-butylstyrene and 1,1-diphenylstyrene, and one or more compounds are selected from these. Particularly, styrene is suitable. Conjugated diene compounds include butadiene, isoprene, 1,3-pentadiene and 2,3-dimethyl-1,3-butadiene, and one or more compounds are selected from these. Specifically, butadiene and isoprene, and a combination thereof are suitable.

Preferable diene block copolymer includes: those of which structure being SBS (styrene-butadiene-styrene) having polybutadiene blocks containing epoxy groups, and those of which structure being SIS (styrene-isoprene-styrene) having polyisoprene blocks containing epoxy groups. Illustrative examples of diene block copolymer include "Epofriend®", trade name by Daicel Chemical Industries, Ltd., and more specifically, "Epofriend® A1010" can be exemplified.

To the solid particle 14, a filler may be blended as needed. Suitable fillers include inorganic salts such as zinc oxide, barium sulfate, calcium carbonate and the like; and powder of highly dense metal such as tungsten, molybdenum and the like. Two or more fillers may be used in combination.

Figure 5:
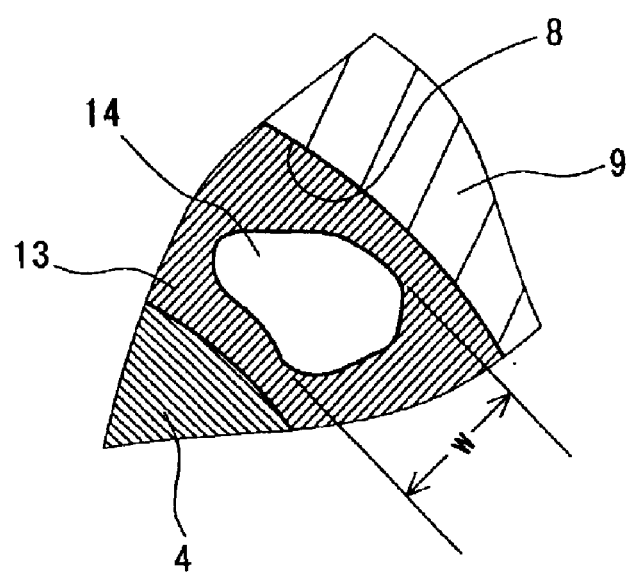
FIG. 5 is an enlarged view illustrating a part of the FIG. 4.

FIG. 5 is an enlarged view illustrating a part of the FIG. 4. In this FIG. 5, both sided arrow heads W designate a width of the solid particles 14 in a radial direction (a direction of a radius of the golf ball 1). This width W is determined by actual measurement of a test piece which is obtained by cutting the golf ball 1. A ratio "W/T", i.e., a ratio of the radial width W to the thickness of the mid layer T, is preferably from 0.3 to 1.0. When the ratio "W/T" is less than the above range, migration of the center 4 which is going to approach the cavity face 8 is not sufficiently inhibited. In this respect, the ratio "W/T" is more preferably equal to or greater than 0.5, and particularly preferably equal to or greater than 0.7. When the ratio "W/T" is greater than the above range, solid particles 14 keep the center 4 away from the cavity face 8, thereby the deviation of mass being facilitated. Four positions for the measuring point equally spaced are selected along a seam (a great circle corresponding to a parting line) on the surface of the mid layer 5, and further, additional positions for the measuring point are also selected which correspond to bipolar points when this seam is assumed as an equator of a globe. Accordingly, thickness is measured at 6 positions in total for the measuring point. A mean value from six data is determined as a thickness "T" of the mid layer.

It is preferred that 6 or more solid particles 14 having a ratio "W/T" in the range described above are included in the mid layer 5. When the number of the solid particles 14 is less than the above range, it is difficult to sufficiently suppress the deviation of mass. In this respect, the number of the solid particles 14 is preferably 8 or more, and particularly preferably 18 or more. When the solid particles 14 are in excessive quantities, adverse effects may be exerted on properties such as a feel at impact and durability of the golf ball 1. Therefore, it is preferred that the number of the solid particles 14 be 100 or less, more preferably 80 or less, and particularly preferably 60 or less.

The ratio "D/T", i.e., a ratio of the particle size D of the solid particles 14 to the thickness of the mid layer T, is preferably equal to or greater than 0.3. When the ratio "D/T" is less than the above range, migration of the center 4 which is going to approach the cavity face 8 is not sufficiently inhibited. In this respect, the ratio "D/T" is preferably equal to or greater than 0.5, and particularly preferably equal to or greater than 0.7. In light of the suppressive effect to be kept the center 4 away from the cavity face 8 by the solid particles 14, the ratio "D/T" is preferably equal to or less than 1.0. Particle size D is measured in accordance with a standard of "JIS K 6316" using a sieve defined in "JIS Z 8801".

It is preferred that 6 or more solid particles 14 having a ratio "D/T" in the range described above are included in the mid layer 5. When the number of the solid particles 14 is less than the above range, it is difficult to sufficiently suppress the deviation of mass. In this respect, the number of the solid particles 14 is preferably 8 or more, and particularly preferably 18 or more. When the solid particles 14 are in excessive quantities, adverse effects may be exerted on properties such as a feel at impact and durability of the golf ball 1. Therefore, it is preferred that the number of the solid particles 14 be 100 or less, more preferably 80 or less, and particularly preferably 60 or less. In view of suppression of the deviation of mass, it is preferred that all of the solid particles 14 have an identical particle size D.

Volume of the solid particles 14 is preferably from 0.06 $mm^3$ to 550 $mm^3$. When the volume is below the above range, the deviation of mass may be insufficiently suppressed. In this respect, the volume is more preferably equal to or greater than 0.1 $mm^3$, even more preferably equal to or greater than 0.5 $mm^3$, and particularly preferably equal to or greater than 4 $mm^3$. When the volume is beyond the above range, the solid particles 14 may adversely affect on properties such as a feel at impact and durability of the golf ball 1. In this respect, the volume is more preferably equal to or less than 280 $mm^3$, and particularly preferably equal to or less than 50 $mm^3$. Number of the solid particles 14 of which volume being within the range described above is preferably from 6 to 100.

It is preferred that total volume of the solid particles 14 accounts for equal to or less than 50% of the volume of the mid layer 5. Adverse effects on properties such as a feel at impact and durability of the golf ball 1 by the solid particles 14 are thereby suppressed. In this respect, the total volume of the solid particles 14 accounts for more preferably equal to or less than 40% and particularly preferably equal to or less than 35% of the volume of the mid layer 5.

Examples of the shape of the solid particles 14 include sphere, cube, rectangular solid and circular cylinder. In view of suppression of the deviation of mass, substantially spherical solid particle 14 is suitable. Specific gravity of the solid particle 14 is usually from 0.8 to 1.5.

JIS-C hardness of the solid particle 14 is preferably equal to or greater than 30. When the hardness is below the range described above, the solid particle 14 deforms in the step of outflow of the rubber composition (STP7), and thus it is incapable of sufficiently inhibiting the migration of the center 4 to the cavity surface 8. In this respect, the hardness is more preferably equal to or greater than 35, and particularly preferably equal to or greater than 40. Too high hardness may result in adverse effects on properties such as a feel at impact and durability of the golf ball 1 by the solid particles 14. In this respect, the hardness is preferably equal to or less than 98, more preferably equal to or less than 95, and particularly preferably equal to or less than 90. The hardness is measured in accordance with a standard of JIS-K 6301, with C type spring hardness scale.

The solid particle 14 comprising a crosslinked rubber can be formed by a known procedure such as a compression molding method, an injection molding method and the like. In general, a crosslinking reaction of the rubber takes place concurrently with molding. Common molding temperature is from 120° C. to 180° C., with the molding time period of from 10 minutes to 60 minutes. The crosslinking reaction may be caused by forming an uncrosslinked particle, and keeping the particle at a high temperature of equal to or higher than 120° C. Generally, time period during which the particle is kept at the above-described temperature is from 30 minutes to 12 hours. The solid particle 14 containing a thermoplastic resin as a predominant component can be formed by a known procedure such as a compression molding method, an injection molding method, en extrusion molding method and the like.

A base rubber of the center 4 suitably includes polybutadienes, polyisoprenes, styrene-butadiene copolymers, ethylene-propylene-diene copolymers (EPDM), natural rubbers and the like. Two or more kinds of these rubbers may be used in combination. In view of the resilience performance, polybutadienes are preferred. Even in the case where another rubber is used in combination with a polybutadiene, to employ a polybutadiene as a predominant component is preferred. More specifically, it is preferred that the ratio of the polybutadiene in total base rubber is greater than or equal to 50% by weight, and in particular, greater than or equal to 80% by weight of polybutadiene occupied in total weight of the base rubber. Among polybutadienes, high cis-polybutadienes are preferred, which have a percentage of cis-1,4 bond of greater than or equal to 40%, in particular, greater than or equal to 80%.

Mode of crosslinking in the center 4 is not particularly limited. Crosslinking agents which can be used include co-crosslinking agents, organic peroxides, sulfur and the like. For the ground that resilience performance can be improved, co-crosslinking agents and organic peroxides are preferred. Preferable co-crosslinking agent in view of the resilience performance includes monovalent or divalent metal salts of α,β-unsaturated carboxylic acid having 2 to 8 carbon atoms. Specific examples of the preferable co-crosslinking agent include zinc acrylate, magnesium acrylate, zinc methacrylate and magnesium methacrylate. In particular, zinc acrylate is preferred which can result in high resilience performance.

An α,β-unsaturated carboxylic acid having 2 to 8 carbon atoms and a metal oxide may be blended as the co-crosslinking agent. Preferable α,β-unsaturated carboxylic acid includes acrylic acid and methacrylic acid, and in particular, acrylic acid is preferred. Preferable metal oxide includes an oxide of zinc and an oxide of magnesium, and in particular, an oxide of zinc is preferred.

The amount of the co-crosslinking agent to be blended is preferably from 10 to 40 parts per 100 parts of the base rubber. When the amount to be blended is below the above range, the center 4 may be so soft that insufficient resilience performance may be achieved. In this respect, the amount to be blended is preferably equal to or greater than 15 parts, and particularly preferably equal to or greater than 20 parts. When the amount to be blended is beyond the above range, the center 4 may be so hard that soft feel at impact can not be experienced. In this respect, the amount to be blended is preferably equal to or less than 35 parts, and particularly preferably equal to or less than 30 parts. The term "parts" used herein refers to weight ratio, i.e., parts by weight.

In the rubber composition for use in the center 4, an organic peroxide may be preferably blended. The organic peroxide serves as a crosslinking agent in conjunction with the above-mentioned metal salt of α,β-unsaturated carboxylic acid, and also serves as a curing agent. By blending the organic peroxide, the resilience performance of the center 4 may be improved. Suitable organic peroxide includes dicumyl peroxide, 1,1-bis(t-butylperoxy)-3,3,5-trimethylcyclohexane, 2,5-dimethyl-2,5-di(t-butylperoxy) hexane and di-t-butyl peroxide. Particularly versatile organic peroxide is dicumyl peroxide.

The amount of the organic peroxide to be blended is preferably from 0.1 parts to 3.0 parts per 100 parts of the base rubber. When the amount to be blended is below the above range, the center 4 may be so soft that insufficient resilience performance may be achieved. In this respect, the amount to be blended is preferably greater than or equal to 0.2 parts, and particularly preferably greater than or equal to 0.5 parts. When the amount to be blended is beyond the above range, the center 4 may be so hard that soft feel at impact can not be experienced. In this respect, the amount to be blended is preferably less than or equal to 2.8 parts, and particularly preferably less than or equal to 2.5 parts.

The rubber composition may be blended with a filler for adjusting specific gravity thereof. Examples of the suitable filler include inorganic salts such as zinc oxide, barium sulfate, calcium carbonate and the like; and powder of highly dense metal such as tungsten, molybdenum and the like. The amount of these fillers to be blended is determined ad libitum so that the intended specific gravity of the center can be accomplished. Preferable filler is zinc oxide because it serves not only as an agent for adjusting specific gravity but also as a crosslinking activator.

Various additives such as anti-aging agents, coloring agents, plasticizers, dispersant and the like may be blended at an appropriate amount to the rubber composition as needed.

Specific gravity of the center 4 usually ranges from 1.05 to 1.25. Diameter of the center 4 usually ranges from 15 mm to 38 mm. The center 4 may have two or more layers.

In general, crosslinking in the center 4 is achieved upon heating in the molding step (STP2). Alternatively, the center 4 post-molding step may be obtained in an uncrosslinked state or a semicrosslinked state, and then be crosslinked in any of the following steps (for example, crosslinking step for the mid layer 5).

As a matrix of the mid layer 5, a rubber composition which is similar to the center 4 may be used. Thickness of the mid layer T is preferably from 0.5 mm to 10 mm. The mid layer 5 having a thickness T of less than the above range involves difficulties in molding. In this respect, the thickness T is more preferably equal to or greater than 0.6 mm, even more preferably equal to or greater than 1.0 mm, and particularly preferably equal to or greater than 2.0 mm. When the thickness T is beyond the above range, extremely great solid particles 14 are required to suppress the deviation of mass. Such solid particles 14 may adversely affect on properties such as a feel at impact and durability of the golf ball 1. In this respect, thickness T is more preferably equal to or less than 9.0 mm, particularly preferably equal to or less than 6.0 mm.

This core 2 has the center 4 and the mid layer 5, therefore, a degree of freedom for designing the distribution of hardness and the distribution of weight is higher than a core 2 constituted from a single layer. For example, a core 2 in which hardness of the mid layer 5 is greater than hardness of the center 4, a core 2 in which hardness of the mid layer 5 is less than hardness of the center 4, a core 2 in which specific gravity of the mid layer 5 is greater than specific gravity of center 4, a core 2 in which specific gravity of the mid layer 5 is less than specific gravity of the center 4 can be produced.

The cover 3 is usually formed from a resin composition. Suitable base polymer for the resin composition includes, similar ionomer resins, thermoplastic elastomers and diene block copolymers to those for use in the solid particles 14 described above. Coloring agents such as titanium dioxide and the like, fillers such as barium sulfate and the like, dispersants, anti-aging agents, ultraviolet absorbers, light stabilizers, fluorescent agents, fluorescent bleaching agents and the like may be blended at an appropriate amount in the cover 3 as needed. Specific gravity of the cover 3 ranges usually from 0.9 to 1.4.

Thickness of the cover 3 preferably ranges from 0.5 mm to 2.5 mm. When the thickness is below the above range, difficulties in molding of the cover 3 are accompanied, and deteriorated durability of the golf ball 1 may be raised. In this respect, the thickness is more preferably equal to or greater than 1.0 mm, and particularly preferably equal to or greater than 1.1 mm. When the thickness is beyond the above range, unpleasant feel at impact may be experienced. In this respect, the thickness is particularly preferably equal to or less than 2.4 mm. The cover 3 may have two or more layers. Another mid layer may be formed between the cover 3 and the mid layer 5.

The cover 3 can be formed by a known procedure such as a compression molding method, an injection molding method and the like. By providing a number of protrusions on the cavity face 8 of a mold, dimples 6 having a reversed shape of such a protrusion are formed on the surface of the cover 3. The plane shape of the dimple 6 (i.e., the contour of the dimple 6 observed by viewing the center of the golf ball 1 at infinity) is usually circular, however, non-circular shape (e.g., ellipsoid, oval, polygon, star, tear drops and the like) is also permitted. Sectional shape of the circular dimple 6 may be a single radius shape (i.e., circular-arc), or a double radius shape (i.e., dish-like). In view of the flight performance, total number of the dimples 6 is preferably from 340 to 540, and particularly preferably, from 360 to 500. In view of the flight performance, summation of volume of the dimples preferably ranges from 300 $mm^3$ to 700 $mm^3$, and particularly preferably from 400 $mm^3$ to 600 $mm^3$. Volume of a dimple means volume of a space surrounded by the surface of a dimple 6 and a phantom spherical surface of the ball. In view of the flight performance, surface area occupation ratio of dimples 6 preferably ranges from 65% to 90%, and particularly preferably from 70% to 85%. The surface area occupation ratio means a percentage (%) of the summation of plain area of the dimples 6 occupied in the surface area of the phantom spherical surface of the ball.

EXAMPLES

[Molding of Solid Particle]

A rubber composition was obtained by kneading 100 parts of polybutadiene, 34 parts of zinc acrylate, 18.5 parts of zinc oxide and 1.1 parts of dicumyl peroxide in an internal kneading machine. This rubber composition was placed in a mold having a spherical cavity, kept at 151° C. for 21 minutes to obtain a solid particle A which is spherical, has volume of 33.5 $mm^3$, and has a particle size D of 4.0.

In a similar manner to the case of the solid particle A except that the mold was changed, solid particles B to D were obtained. In addition, in a similar manner to the case of the solid particle A except that the compounding amount and the mold were changed, a solid particle E was obtained.

A thermoplastic polyurethane elastomer was injected into a mold to obtain a solid particle F which is spherical, has volume of 11.5 $mm^3$, and has a particle size D of 2.8. Furthermore, a resin composition consisting of 70 parts of an ionomer resin and 30 parts of a thermoplastic styrene elastomer was injected into a mold to obtain a solid particle G which is spherical, has volume of 11.5 $mm^3$, and has a particle size D of 2.8.

Example 1

A rubber composition was obtained by kneading 100 parts of polybutadiene, 25 parts of zinc acrylate, 22 parts of zinc oxide and 1.0 part of dicumyl peroxide in an internal kneading machine. This rubber composition was placed in a mold having a spherical cavity, kept at 142° C. for 23 minutes and further kept at 168° C. for 6 minutes to obtain a center having a diameter of 30.2 mm.

Next, a rubber composition was obtained by kneading 80 parts of polybutadiene (BR01), 20 parts of an other polybutadiene (BR10), 34 parts of zinc acrylate, 18.5 parts of zinc oxide and 1.1 parts of dicumyl peroxide in an internal kneading machine, and by further kneading after placing the solid particle B. This rubber composition was placed into a mold and compressed to give a half shell. The center was covered with two of the half shells, and the center and the half shells were placed into a mold followed by keeping at 151° C. for 21 minutes. Accordingly, a core of which diameter is 38.2 mm was obtained including a mid layer having a thickness T of 4.0 mm. This mid layer has 60 solid particles dispersed therein of which ratio "D/T" being 0.5.

Next, 63 parts of an ionomer resin "Himilan 1605", 37 parts of another ionomer resin "Himilan 1706" and 2.2 part of barium sulfate were kneaded to give a resin composition. On the other hand, a core was placed into a mold having a spherical cavity, and thereafter the resin composition that had been melted by heating was injected around the core to obtain a cover having a thickness of 2.2 mm. Coating was executed around this cover, and thus a golf ball was obtained.

Examples 2 to 6 and Comparative Examples 1 to 2

In a similar manner to Example 1, a golf ball was obtained except that the constitution, the mold and molding condition for the center and the mid layer were as shown in Table 2; and the type and number of the solid particle were as shown in Table 3.

TABLE 1

| | Solid Particle | | | | | | |
|---|---|---|---|---|---|---|---|
| Type | A | B | C | D | E | F | G |
| Polybutadiene *1 | 100 | 100 | 100 | 100 | 100 | — | — |
| Zinc acrylate | 34 | 34 | 34 | 34 | 25 | — | — |
| Zinc oxide | 18.5 | 18.5 | 18.5 | 18.5 | 22 | — | — |
| Dicumyl peroxide | 1.1 | 1.1 | 1.1 | 1.1 | 1.0 | — | — |
| Thermoplastic polyurethane elastomer *2 | — | — | — | — | — | 100 | — |
| Ionomer resin *3 | — | — | — | — | — | — | 70 |
| Thermoplastic styrene elastomer *4 | — | — | — | — | — | — | 30 |
| Volume ($mm^3$) | 33.5 | 4.2 | 0.5 | 0.1 | 130.9 | 11.5 | 11.5 |
| Particle size (mm) | 4.0 | 2.0 | 1.0 | 0.6 | 6.3 | 2.8 | 2.8 |
| Specific gravity | 1.143 | 1.143 | 1.143 | 1.143 | 1.145 | 1.110 | 0.935 |

*1 "BR01", trade name by JSR Corporation
*2 "Elastolan ET880", trade name by BASF Polyurethane Elastomers Co., Ltd.,
*3 "Himilan 1605", trade names by Mitsui-Dupont Polychemical Co. Ltd.
*4 "Rabalon ® SR04", trade name by Mitsubishi Chemical Corporation

TABLE 2

Details of Center and Mid layer matrix

|  |  | Comparative Example 1 | Example 1 | Example 2 | Example 3 | Example 4 | Example 5 | Example 6 | Comparative Example 2 |
|---|---|---|---|---|---|---|---|---|---|
| Center | Polybutadiene *1 | 100 | 100 | 100 | 100 | 100 | 100 | 100 | 100 |
|  | Zinc acrylate | 25 | 25 | 34 | 25 | 25 | 25 | 25 | 25 |
|  | Zinc oxide | 22 | 22 | 18.5 | 22 | 22 | 22 | 22 | 22 |
|  | Dicumyl peroxide | 1.0 | 1.0 | 1.0 | 1.0 | 1.0 | 1.0 | 1.0 | 1.0 |
|  | Vulcanizing Condition (° C*min) |  |  |  |  |  |  |  |  |
|  | 1st stage | 142*23 | 142*23 | 158*22 | 142*23 | 142*23 | 142*23 | 155*30 | 142*23 |
|  | 2nd stage | 168*6 | 168*6 | — | 168*6 | 168*6 | 168*6 | — | 168*6 |
|  | External diameter (mm) | 30.2 | 30.2 | 21.0 | 30.2 | 30.2 | 30.2 | 37.0 | 30.2 |
|  | Specific gravity | 1.145 | 1.145 | 1.143 | 1.145 | 1.145 | 1.145 | 1.145 | 1.145 |
| Mid layer Matrix | Polybutadiene *1 | 80 | 80 | 80 | 80 | 80 | 80 | 80 | 80 |
|  | Polybutadiene *5 | 20 | 20 | 20 | 20 | 20 | 20 | 20 | 20 |
|  | Zinc acrylate | 34 | 34 | 33 | 34 | 34 | 34 | 34 | 34 |
|  | Zinc oxide | 18.5 | 18.5 | 18.9 | 18.5 | 18.5 | 18.5 | 18.5 | 18.5 |
|  | Dicumyl peroxide | 1.1 | 1.1 | 0.6 | 1.1 | 1.1 | 1.1 | 1.1 | 1.1 |
|  | Vulcanizing Condition (° C.*min) | 151*21 | 152*21 | 160*20 | 152*21 | 152*21 | 151*21 | 160*20 | 151*21 |
|  | External diameter (mm) | 38.2 | 38.2 | 39.0 | 38.2 | 38.2 | 38.2 | 38.2 | 38.2 |
|  | Thickness T (mm) | 4.0 | 4.0 | 9.0 | 4.0 | 4.0 | 4.0 | 0.6 | 4.0 |
|  | Specific gravity | 1.143 | 1.143 | 1.144 | 1.143 | 1.143 | 1.143 | 1.143 | 1.143 |

*1 "BR01", trade name by JSR Corporation
*5 "BR10", trade name by JSR Corporation

[Evaluation of Mass Deviation]

Four positions for the measuring point equally spaced were selected along a seam on the surface of the mid layer, and further, additional positions for the measuring point were also selected which correspond to bipolar points when this seam is assumed as an equator of a globe. Accordingly, thickness of the mid layer was measured at 6 positions in total. A maximum value among 6 data was determined as Tmax, while the minimum value among them was determined as Tmin. Deviation of mass was determined as a value: (Tmax−Tmin). Average values of deviation of mass from 10 golf balls, and the values of deviation of mass of a golf ball having a maximum value are represented in Table 3 below.

[Measurement of Radial Width]

The golf ball according to Example 3 was cut, and the radial width W of the solid particle was measured as being 2.9 mm. Ratio "W/T" for this golf ball is 0.73. Similarly, radial width W of the solid particle in the golf ball according to Example 4 was measured as being 3.0 mm. Ratio "W/T" for this golf ball is 0.75.

[Travel Distance Test]

[Evaluation with W1]

A driver with a metal head was equipped with a swing machine (True Temper Co.). Then the machine was conditioned to give a head speed of 40 m/s. Twenty golf balls for each of the Examples and Comparative Examples were hit. Launch angle and carry were measured accordingly. "Launch angle" means a degree of trajectory track of the golf ball immediately after hitting on the basis of the horizontal direction, whilst "carry" means a distance (m) from the hitting point to the fall point of the golf ball. Average values and variations (i.e., a value obtained by subtracting the minimum value from the maximum value) for the launch angle and carry are represented in Table 3 below. Direction of the wind during the measurement was nearly headwind, and the velocity of wind was about 2 m/s. The results are represented in Table 3 below.

[Evaluation with I5]

A number five iron was equipped with the swing machine, which was conditioned to give a head speed of 34 m/s. Then average values and variations for the launch angle and carry were measured similarly to the measurement for the driver. The results are represented in Table 3 below.

[Evaluation of Feel at Impact]

Using a driver with a metal head, 15 golf balls according to each of the Examples and Comparative Examples respectively were hit by 10 senior golfers. Thus, variation of the feel at impact was evaluated. When variation was not experienced, the ball was evaluated as "A", whilst the ball with variation was evaluated as "B". Table 3 below represents the either of the evaluation "A" or "B", which was assigned by more golfers.

TABLE 3

Results of Evaluation

|  | Comparative Example 1 | Example 1 | Example 2 | Example 3 | Example 4 | Example 5 | Example 6 | Comparative Example 2 |
|---|---|---|---|---|---|---|---|---|
| Type of solid particles in mid layer | C | B | E | F | G | A | D | — |
| (D/T) | 0.25 | 0.5 | 0.7 | 0.7 | 0.7 | 1.0 | 1.0 | — |
| Number of solid particles in mid layer | 8 | 60 | 6 | 18 | 24 | 8 | 100 | — |

TABLE 3-continued

| | | | Comparative Example 1 | Example 1 | Example 2 | Example 3 | Example 4 | Example 5 | Example 6 | Comparative Example 2 |
|---|---|---|---|---|---|---|---|---|---|---|
| Average deviation of mass (mm) | | | 1.7 | 0.8 | 0.6 | 0.5 | 0.4 | 0.05 | 0.02 | 1.7 |
| Maximum deviation of mass (mm) | | | 2.5 | 1.2 | 1.0 | 0.8 | 0.7 | 0.1 | 0.08 | 2.6 |
| Travel distance test | W1 | Average of launch angle (°) | 11.8 | 11.8 | 11.7 | 11.9 | 12.1 | 11.8 | 11.8 | 11.8 |
| | | Variation of launch angle (°) | 1.0 | 0.3 | 0.3 | 0.2 | 0.2 | 0.2 | 0.1 | 1.0 |
| | | Average of carry | 202.0 | 202.0 | 200.5 | 202.5 | 202.0 | 202.0 | 201.0 | 202.0 |
| | | Variation of carry | 6.5 | 3.0 | 3.5 | 3.0 | 3.0 | 2.0 | 2.0 | 7.0 |
| | I5 | Average of launch angle (°) | 16.2 | 16.4 | 16.0 | 16.5 | 16.4 | 16.2 | 16.1 | 16.4 |
| | | Variation of launch angle (°) | 0.9 | 0.2 | 0.2 | 0.2 | 0.2 | 0.1 | 0.1 | 0.9 |
| | | Average of carry | 154.0 | 153.5 | 152.0 | 154.0 | 154.0 | 154.0 | 153.0 | 153.5 |
| | | Variation of carry | 4.5 | 2.0 | 2.0 | 1.5 | 1.5 | 1.0 | 1.0 | 4.5 |
| Variation of feel at impact | | | B | A | A | A | A | A | A | B |

As is shown in Table 3, the golf ball of each of Examples exhibited less deviation of mass, less variation for the launch angle and carry, and less variation for the feel at impact. Accordingly, advantages of the present invention are clearly indicated by these results of evaluation.

The description herein above is merely for illustrative examples, and therefore, various modifications can be made without departing from the principles of the present invention.

What is claimed is:

1. A process for producing a golf ball comprising the steps of:
   a kneading step to obtain a rubber composition by kneading a base rubber, a crosslinking agent and solid particles; and
   a molding step to form a mid layer by placing a center and said rubber composition disposed around the center into a spherical cavity of a mold comprising an upper portion and a lower portion, followed by compression of the rubber composition in the mold, and by allowing excess rubber composition to outflow from a space between the upper portion and the lower portion of the mold,
   wherein adjustment is executed so that said mid layer comprises 6 or more solid particles having a ratio "D/T", a ratio of the particle size D to the thickness of the mid layer T, of equal to or greater than 0.7.

2. A process for producing a golf ball comprising the steps of:
   a kneading step to obtain a rubber composition by kneading a base rubber, a crosslinking agent and solid particles; and
   a molding step to form a mid layer by placing a center and said rubber composition disposed around the center into a spherical cavity of a mold comprising an upper portion and a lower portion, followed by compression of the rubber composition in the mold, and by allowing excess rubber composition to outflow from a space between the upper portion and the lower portion of the mold,
   wherein adjustment is executed so that said mid layer comprises 6 or more solid particles having a ratio "W/T", a ratio of the radial width W thereof to the thickness of the mid layer T, of 0.7 or greater and 1.0 or less.

3. A process for producing a golf ball comprising the steps of:
   a kneading step to obtain a rubber composition by kneading a base rubber and a crosslinking agent;
   a preliminary molding step to form a half shell from said rubber composition;
   an embedding step to embed solid particles into said half shell;
   a covering step to cover a center with two half shells; and
   a molding step to form a mid layer by placing thus integrated center and half shells into a spherical cavity of a mold comprising an upper portion and a lower portion followed by compression of the half shells in the mold, and by allowing excess rubber composition to outflow from a space between the upper portion and the lower portion of the mold,
   wherein adjustment is executed so that said mid layer comprises 6 or more solid particles having a ratio "D/T", a ratio of the particle size D to the thickness of the mid layer T, of equal to or greater than 0.3.

4. A process for producing a golf ball comprising the steps of:
   a kneading step to obtain a rubber composition by kneading a base rubber and a crosslinking agent;
   a preliminary molding step to form a half shell from said rubber composition;
   an embedding step to embed solid particles into said half shell;
   a covering step to cover a center with two half shells; and
   a molding step to form a mid layer by placing thus integrated center and half shells into a spherical cavity of a mold comprising an upper and a lower portion followed by compression of the half shells in the mold, and by allowing excess rubber composition to outflow from a space between the upper portion and the lower portion of the mold,
   wherein adjustment is executed so that said mid layer comprises 6 or more solid particles having a ratio "W/T", a ratio of the radial width W thereof to the thickness of the mid layer T, of from 0.3 to 1.0.

* * * * *